US012776288B2

(12) United States Patent
Cheng et al.

(10) Patent No.: US 12,776,288 B2
(45) Date of Patent: Oct. 27, 2026

(54) IMAGE PROCESSING DEVICE AND IMAGE DISPLAY METHOD

(71) Applicant: E Ink Holdings Inc., Hsinchu (TW)

(72) Inventors: Hsiao-Lung Cheng, Hsinchu (TW); Shu-Cheng Liu, Hsinchu (TW); Pei-Lin Tien, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 19/051,196

(22) Filed: Feb. 12, 2025

(65) Prior Publication Data

US 2025/0273176 A1 Aug. 28, 2025

(30) Foreign Application Priority Data

Feb. 23, 2024 (TW) ................................ 113106685

(51) Int. Cl.
*G09G 5/00* (2006.01)
*G09G 3/34* (2006.01)

(52) U.S. Cl.
CPC ......... *G09G 3/344* (2013.01); *G09G 2310/06* (2013.01); *G09G 2330/06* (2013.01)

(58) Field of Classification Search
CPC . G09G 3/344; G09G 2310/06; G09G 2330/06
USPC .......................................................... 345/208
See application file for complete search history.

(56) References Cited

U.S. PATENT DOCUMENTS 8,373,649 B2 * 2/2013 Low ...................... G09G 3/344 345/204
8,860,701 B2 10/2014 Shih et al.
10,923,011 B2 2/2021 Wu et al.
2006/0262083 A1 * 11/2006 Zhou ...................... G09G 3/344 345/107
2008/0024473 A1 1/2008 Hsu et al.
2011/0216104 A1 9/2011 Chan et al.
2013/0300779 A1 * 11/2013 Van Baarsen .......... G09G 5/363 345/690
2016/0109934 A1 4/2016 Woo et al.
2019/0212626 A1 * 7/2019 Chiu ..................... G02F 1/1685
2020/0159085 A1 5/2020 Porush et al.

FOREIGN PATENT DOCUMENTS

| | | | |
|---|---|---|---|
| CN | 101887695 | A | 11/2010 |
| TW | 201101273 | A | 1/2011 |
| TW | 201243794 | A | 11/2012 |
| TW | 202219935 | A | 5/2022 |

OTHER PUBLICATIONS

The office action of TW application No. 113106685 issued on Feb. 5, 2025.

* cited by examiner

*Primary Examiner* — Jennifer T Nguyen
(74) *Attorney, Agent, or Firm* — CKC & Partners Co., LLC

(57) ABSTRACT

An image processing device, comprising a controller and a driver. The controller is configured to provide an image data and a plurality of waveform data. The image data comprises a plurality of pixel values of a plurality of frame periods, and the plurality of waveform data corresponds to the plurality of frame periods. The driver is coupled to the controller and a display circuit, and is configured to receive the image data and a first part of the plurality of waveform data from the controller. After the driver drives the display circuit according to the first part of the plurality of waveform data, the driver receives a second part of the waveform data from the controller.

13 Claims, 3 Drawing Sheets

200

IMAGE PROCESSING DEVICE AND IMAGE DISPLAY METHOD

CROSS-REFERENCE TO RELATED APPLICATION

This application claims priority to Taiwan Application Serial Number 113106685, filed Feb. 23, 2024, which is herein incorporated by reference in its entirety.

BACKGROUND

Technical Field

The present disclosure relates to image display technology, more particularly an image processing device and an image display method.

Description of Related Art

In various consumer electronics markets, "reflective display device" is widely used to implement the display screen, such as electronic paper display devices. The reflective display device mainly uses incident light to illuminate a display medium layer to achieve the purpose of display, so it can save power. However, as the image color or resolution increases, the size of the image data transmitted by the display device also increases, which may have a negative impact within the display device.

SUMMARY

One aspect of the present disclosure is an image processing device, comprising a controller and a driver. The controller is configured to provide an image data and a plurality of waveform data. The image data comprises a plurality of pixel values of a plurality of frame periods, and the plurality of waveform data corresponds to the plurality of frame periods. The driver is coupled to the controller and a display circuit, and is configured to receive the image data and a first part of the plurality of waveform data from the controller. After the driver drives the display circuit according to the first part of the plurality of waveform data, the driver receives a second part of the waveform data from the controller.

Another aspect of the present disclosure is an image display method, comprising: transmitting, by a controller, an image data to a driver, wherein the image data comprises a plurality of pixel values of a plurality of frame periods; transmitting, by the controller, a first part of a plurality of waveform data to the driver, wherein the plurality of waveform data corresponds to the plurality of frame periods; driving, by the driver, a display circuit according to the first part of the plurality of waveform data; and receiving, by the driver, a second part of the waveform data from the controller.

Another aspect of the present disclosure is an image processing device, comprising a controller and a driver. The controller is configured to provide an image data and a plurality of waveform data. The image data comprises a plurality of pixel values of a plurality of frame periods, and the plurality of waveform data corresponds to the plurality of frame periods. The driver is coupled to the controller and a display circuit, and is configured to receive the image data and a first part of the plurality of waveform data from the controller. When the driver decodes the first part of the plurality of waveform data to generate a plurality of voltage data, the driver receives a second part of the waveform data from the controller.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

For the embodiment below is described in detail with the accompanying drawings, embodiments are not provided to limit the scope of the present disclosure. Moreover, the operation of the described structure is not for limiting the order of implementation. Any device with equivalent functions that is produced from a structure formed by a recombination of elements is all covered by the scope of the present disclosure. Drawings are for the purpose of illustration only, and not plotted in accordance with the original size.

It will be understood that when an element is referred to as being "connected to" or "coupled to", it can be directly connected or coupled to the other element or intervening elements may be present. In contrast, when an element to another element is referred to as being "directly connected" or "directly coupled," there are no intervening elements present. As used herein, the term "and/or" includes an associated listed items or any and all combinations of more.

Figure 1:
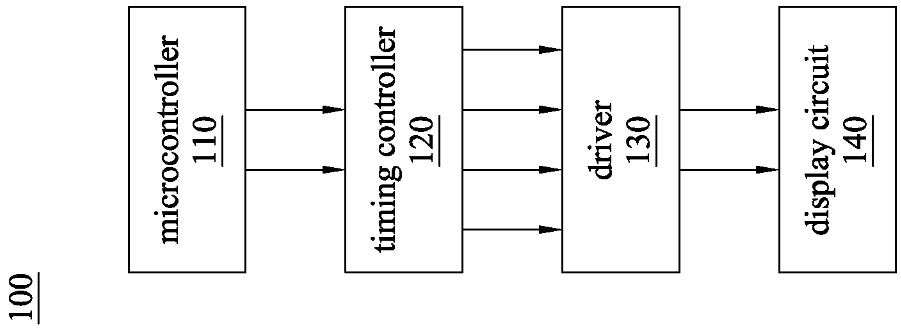
FIG. 1 is a schematic diagram of an image processing device in some embodiments of the present disclosure.

FIG. 1 is a schematic diagram of an image processing device 100 in some embodiments of the present disclosure, which is used to implement a display device (e.g., reflective display device, electronic paper display). The image processing device 100 includes a microcontroller 110, a timing controller 120, a driver 130 and a display circuit 140 (e.g., display panel). The microcontroller 110 is configured to provide an image data. The timing controller 120 stores a waveform look up table, and the waveform look up table records multiple voltage waveforms corresponding to different pixel values. The timing controller 120 is configured to obtain the corresponding voltage waveform according to the image data, and apply voltage to multiple pixel circuits in the display circuit 140 through the driver 130, so as to display the expected the pixel value.

The above "image data" can be an image screen that needs to be updated by the display circuit 140. For example, the image data includes multiple pixel values of multiple frame periods displayed by the display circuit 140. In order for each pixel circuit of the display circuit 140 to display the expected pixel value, the driver 130 needs to provide different voltages sequentially in multiple frame periods. For example, in order to display the pixel value "155", the driver 130 needs to provide voltages of 3V, 0V, and 2V sequentially in three frame periods. The waveform formed by multiple voltages is called "waveform data" here.

For example, each pixel value is controlled by a 2-bit waveform. Under the condition that the resolution is 2560×1600, the refresh rate is 75 Hz, and the data bus in the image processing device 100 is 16 bits, the signal transmission frequency will be 38.4 MHz (2560×1600×75×2/16), which may cause electromagnetic interference (EMI) problems.

Figure 2:
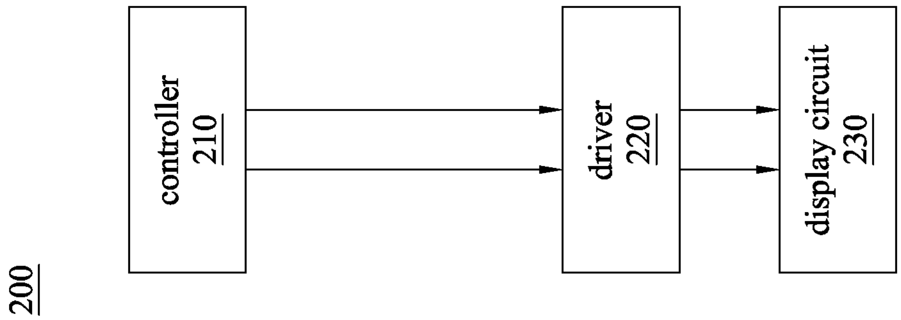
FIG. 2 is a schematic diagram of an image processing device in some embodiments of the present disclosure.

FIG. 2 is a schematic diagram of an image processing device 200 in some embodiments of the present disclosure. The image processing device 200 includes a controller 210 and a driver 220, and is coupled to a display circuit 230. In one embodiment, the image processing device 200 is implemented to a display device, and the display circuit 230 can be a reflective display panel, such as an electrophoretic display device (electronic paper), but the present disclosure is not limited to this. The electrophoretic display device includes a transistor array layer and an electronic ink layer. The transistor array layer (e.g., thin film transistor array, TFT array) can form an electric field according to a control voltage to adjust multiple positions of multiple electrophoretic particles in the electronic ink layer, so as to present different gray scales or different colors. The electronic ink layer includes multiple electrophoretic particles, and the electrophoretic particles belong to different types (e.g., black, white), which are separately encapsulated in multiple microcapsules or microcups to form a pixel unit.

The controller 210 is configured to provide the image data, and stores the complete waveform data. As mentioned above, the image data includes multiple pixel values of multiple frame periods, and corresponds to an image screen that needs to be updated by the display circuit 230. Each of waveform data corresponds to each frame period, and is configured to represent the driving voltage that needs to be provided to the display circuit 230 in each frame.

The driver 220 is coupled to the controller 210 and the display circuit 230, and is configured to receive the image data and the waveform data from the controller 210 to drive the display circuit 230. In order to avoid electromagnetic interference caused by high signal transmission frequency, the controller 210 transmits the waveform data to the driver 220 in batches. In other words, the controller 210 stores complete waveform data, but the driver 220 only needs to store a part of the waveform data. Accordingly, the frequency of signal transmission can be reduced.

The driver 220 is configured to apply voltage to the display circuit 230 according to the waveform data, and each part of the waveform data corresponds to one or more frames. Specifically, the controller 210 first transmits a first part of the waveform data to the driver 220, when the driver 220 starts to decode the first part of the waveform data, or drives the display circuit 230 according to the first part of the waveform data, the controller 210 transmits a second part of the waveform data to the driver 220. Each part of the waveform data can be voltage data (e.g., driving voltage) of one or more frames. For example, the controller 210 first transmits a waveform of a first frame (first part) to the driver 220, then when the driver 220 controls the display circuit 230 to perform the update during the first frame, the controller 210 transmits a waveform of a second frame (second part) to the driver 220.

Figure 3:
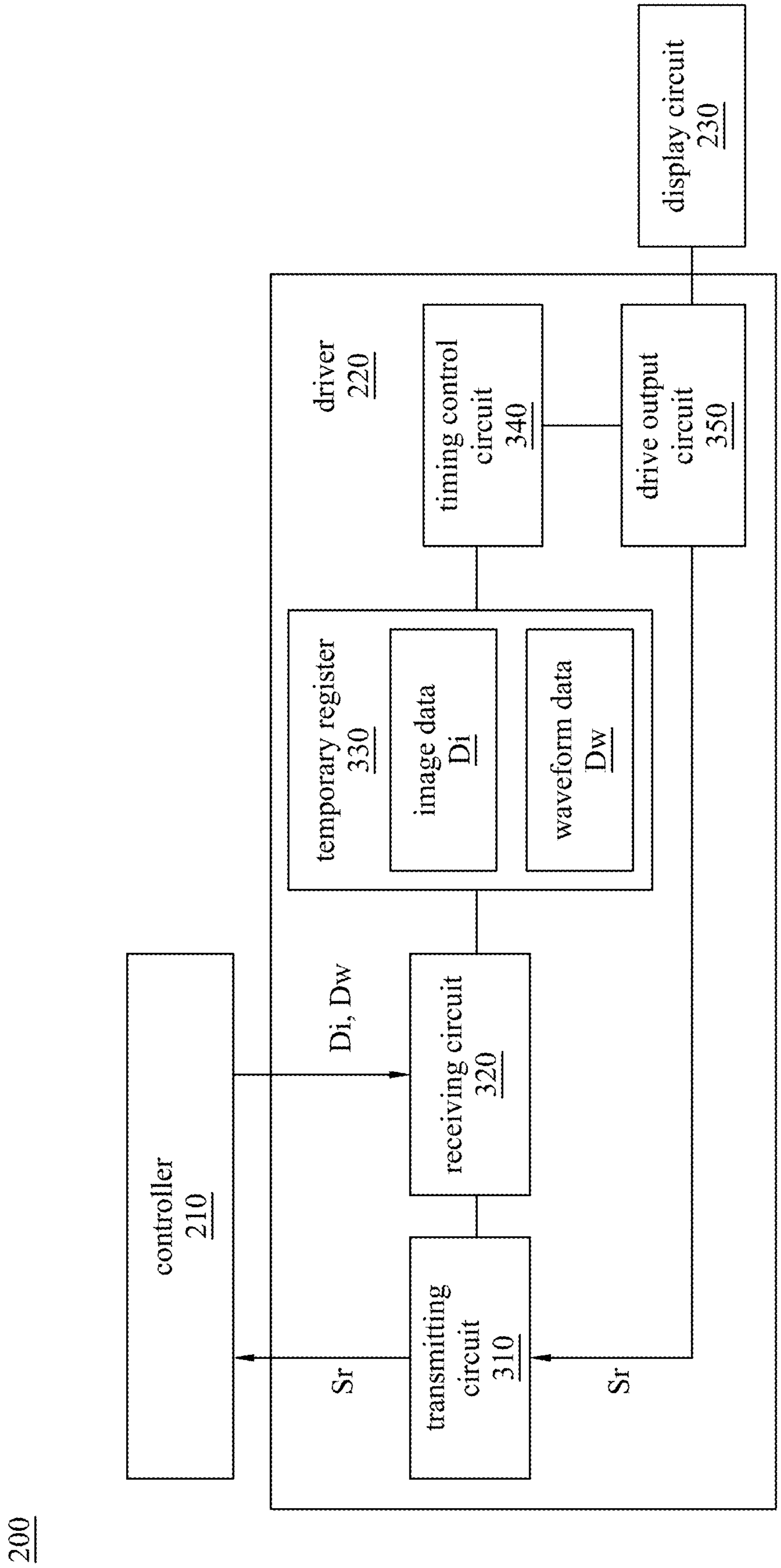
FIG. 3 is a schematic diagram of a driver in some embodiments of the present disclosure.

FIG. 3 is a schematic diagram of a driver 220 in some embodiments of the present disclosure. In one embodiment, the driver 220 includes a transmitting circuit 310, a receiving circuit 320, a temporary register 330, a timing control circuit 340 and a drive output circuit 350. The transmitting circuit 310 and the receiving circuit 320 are respectively coupled to the controller 210, and are configured to transfer data. The temporary register 330 may be a buffer register configured to store the image data Di and parts of the waveform data Dw received from the controller 210. The timing control circuit 340 is configured to decode the waveform data Dw to generate the corresponding voltage data (e.g., driving voltage), and provide the voltage data to the display circuit 230 through the drive output circuit 350, so as to control the display circuit 230 to present/display the corresponding pixel value.

In one embodiment, after the drive output circuit 350 drives display circuit 230 according to a part of the waveform data Dw (i.e., after providing the voltage data to the display circuit 230), the drive output circuit 350 transmits a preparation signal Sr to the controller 210 through the transmitting circuit 310, so as to notify the controller 210 to transmit the next part of the waveform data. In other embodiments, when each of frame periods ends, the drive output circuit 350 transmits the preparation signal Sr to the controller 210 through the transmitting circuit 310, so as to notify the controller 210 can transmit the next part of the waveform data Dw.

In some embodiments, the controller 210 can transmit the next part of the waveform data Dw to the driver 220 when the driver 220 starts to decode a part of the waveform data Dw to generate the voltage data without waiting for the end of the current frame. In other words, the controller 210 can transmit each part of the waveform data Dw in batches according to a preset time interval, and is not limited to transmitting the waveform data Dw in response to the preparation signal Sr. For example, after the timing control circuit 340 decodes the waveform data Dw of the first frame (first part), the receiving circuit 320 can receive the waveform data Dw of the second frame (second part) from the controller 210. Then, when the drive output circuit 350 controls the display circuit 230 to complete the update of the first frame and transmits the preparation signal Sr through the transmitting circuit 310, the controller 210 transmits the waveform data Dw of the third frame (third part) to the receiving circuit 320.

Figure 4:
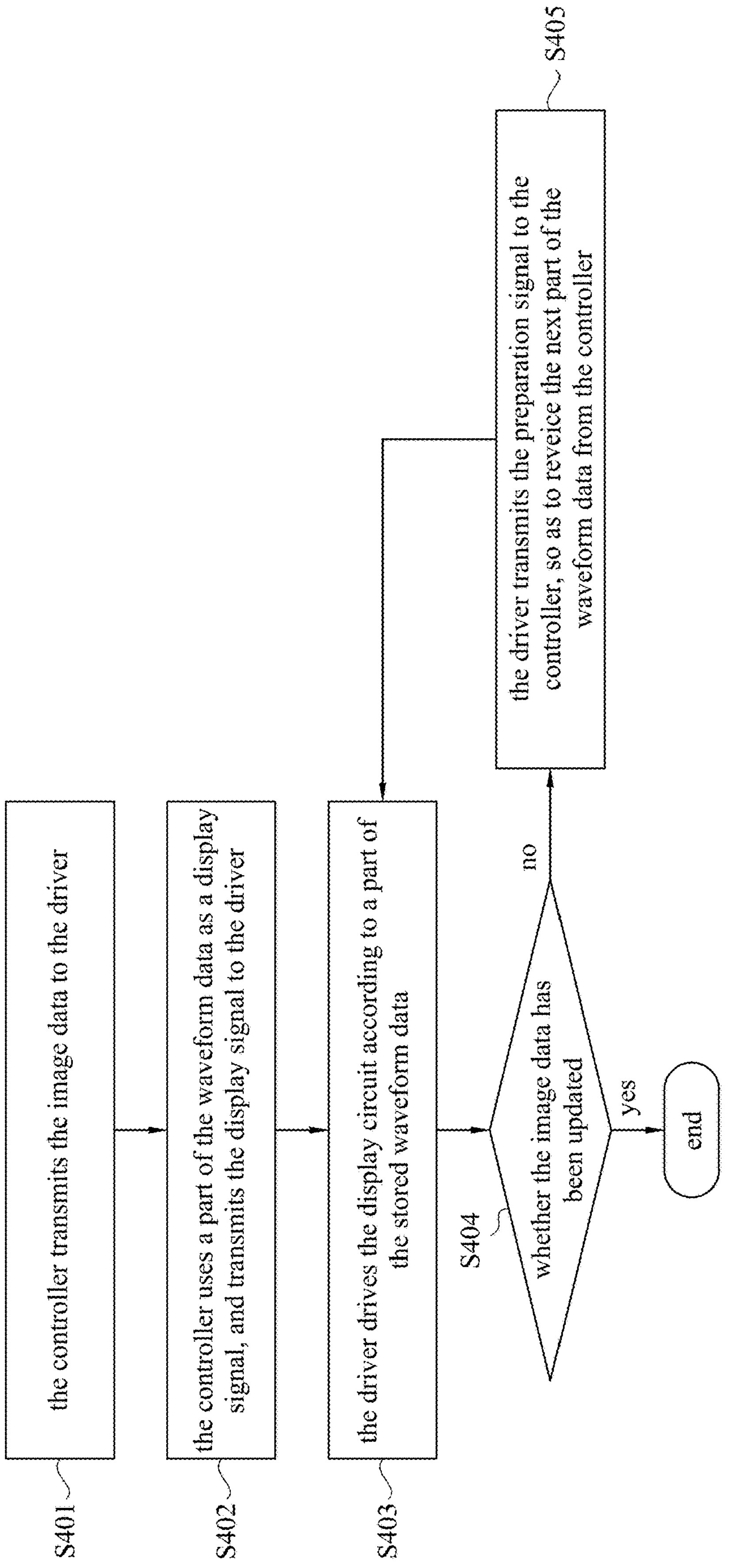
FIG. 4 is a flowchart illustrating an image display method in some embodiments of the present disclosure.

FIG. 4 is a flowchart illustrating an image display method in some embodiments of the present disclosure. Referring to FIG. 2 and FIG. 3, in step S401, the controller 210 first transmits the image data Di to the driver 220. As mentioned above, the image data Di corresponds to an image screen that needs to be updated during multiple frames by the display circuit 230, so the image data Di includes multiple pixel values of multiple frame periods.

In step S402, the controller 210 uses a part of the waveform data Dw as a display signal, and transmits the display signal to the driver 220. Each waveform data Dw corresponds to each frame period, and every part of the waveform data Dw transmitted by the controller 210 is the waveform that needs to use in one or more frame periods.

In step S403, the driver 220 generates a driving voltage according to a part of the image data Di and the waveform data Dw stored in the temporary register 330 to drive the display circuit 230. In one embodiment, the display circuit 230 is an electrophoretic display device, and is configured to form an electric field according to the received voltage data (e.g., driving voltage) to adjust positions of multiple electrophoretic particles in the electronic ink layer.

In step S404, the driver 220 determines whether the image data Di has been completely updated (e.g., determine whether the waveform data of all the frame periods has been received). If the update has been completed, end the current display process.

If the driver 220 determines the image data Di has not been completely updated, in step S405, after the driver 220 drives the display circuit 230 through the drive output circuit 350, the drive output circuit 350 transmits the preparation signal Sr to the controller 210 through the transmitting circuit 310 at the same time, so as to receive the next part of the waveform data Dw from the controller 210.

In the aforementioned embodiment, the controller 210 transmits each part of the waveform data Dw to the driver 220 according to the preparation signal Sr returned by the driver 220, but the present disclosure is not limited to this. In some embodiments, the controller 210 may also actively transmit each part of the waveform data Dw to the driver 220 according to a preset time interval. For example, the controller 210 first transmits the waveform data Dw of the first frame to the driver 220, then after the preset time interval, when the driver 220 decodes the waveform data Dw of the first frame, the controller 210 transmits the waveform data Dw of the second frame to the driver 220, so that the driver 220 stores the waveform data Dw of the second frame in advance.

As mentioned above, after the driver 220 drives the display circuit 230 according to the waveform data Dw of the first frame, the driver 220 transmits the preparation signal Sr to the controller 210 to receive the waveform data Dw of the third frame from the controller 210. At this time, since the driver 220 has received the waveform data Dw of the second frame, the driver 220 can start to decode the waveform data Dw of the second frame while receiving the waveform data Dw of the third frame, so as to drive the display circuit 230.

The present disclosure stores the complete waveform data Dw in the controller 210, and transmits each part of the waveform data Dw to the driver 220 in batches and sequentially. In other words, only a part of the waveform data Dw is transmitted between the controller 210 and the driver 220 at a time, and the driver 220 only needs to store the part currently to be processed and the part to be processed soon of the waveform data Dw. Therefore, the signal transmission frequency in the image processing device 200 will be controlled to avoid possible electromagnetic interference.

The elements, method steps, or technical features in the foregoing embodiments may be combined with each other, and are not limited to the order of the specification description or the order of the drawings in the present disclosure.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

What is claimed is:

1. An image processing device, comprising:
- a controller configured to provide an image data and a plurality of waveform data, wherein the image data comprises a plurality of pixel values of a plurality of frame periods, and the plurality of waveform data corresponds to the plurality of frame periods; and
- a driver coupled to the controller and a display circuit, and configured to receive the image data and a first part of the plurality of waveform data from the controller, wherein after the driver drives the display circuit according to the first part of the plurality of waveform data, the driver determines whether the plurality of waveform data of the plurality of frame periods have all been received, so as to determine whether the image data has been completely updated, and when the image data has not been completely updated, the driver transmits a preparation signal to the controller to obtain a second part of the waveform data from the controller.

2. The image processing device of claim 1, wherein when each of the plurality of frame periods ends, the driver transmits the preparation signal to the controller to obtain the second part of the waveform data from the controller.

3. The image processing device of claim 1, wherein the driver is configured to apply voltage to the display circuit according to the plurality of waveform data, and the first part of the plurality of waveform data corresponds to one or more of the plurality of frame periods.

4. The image processing device of claim 1, wherein the driver is configured to decode the plurality of waveform data to control the display circuit to display the plurality of pixel values.

5. An image display method, comprising:
- transmitting, by a controller, an image data to a driver, wherein the image data comprises a plurality of pixel values of a plurality of frame periods;
- transmitting, by the controller, a first part of a plurality of waveform data to the driver, wherein the plurality of waveform data corresponds to the plurality of frame periods;
- driving, by the driver, a display circuit according to the first part of the plurality of waveform data;
- determining whether the plurality of waveform data of the plurality of frame periods have all been received, so as to determine whether the image data has been completely updated; and
- transmitting, by the driver, a preparation signal to the controller to receive a second part of the waveform data from the controller when the image data has not been completely updated.

6. The image display method of claim 5, wherein transmitting the preparation signal to the controller to receive the second part of the waveform data comprises:
- when each of the plurality of frame periods ends, transmitting the preparation signal to the controller to obtain the second part of the waveform data.

7. The image display method of claim 5, wherein the driver is configured to apply voltage to the display circuit according to the plurality of waveform data, and the first part of the plurality of waveform data corresponds to one or more of the plurality of frame periods.

8. The image display method of claim 5, wherein the driver is configured to decode the plurality of waveform data to control the display circuit to display the plurality of pixel values.

9. An image processing device, comprising:
- a controller configured to provide an image data and a plurality of waveform data, wherein the image data comprises a plurality of pixel values of a plurality of frame periods, and the plurality of waveform data corresponds to the plurality of frame periods; and
- a driver coupled to the controller and a display circuit, and configured to receive the image data and a first part of the plurality of waveform data from the controller, wherein the driver is configured to determine whether the plurality of waveform data of the plurality of frame periods have all been received, so as to determine whether the image data has been completely updated, when the driver decodes the first part of the plurality of waveform data to generate a plurality of voltage data and the image data has not been completely updated, the driver receives a second part of the waveform data from the controller.

10. The image processing device of claim 9, wherein after the driver drives the display circuit according to the first part of the plurality of waveform data, the driver transmits a preparation signal to the controller to obtain a third part of the waveform data from the controller.

11. The image processing device of claim 9, wherein the driver is configured to apply voltage to the display circuit according to the plurality of waveform data, and the first part of the plurality of waveform data corresponds to one or more of the plurality of frame periods.

12. The image processing device of claim 9, wherein the display circuit is an electrophoretic display device, and is configured to adjust a plurality of positions of a plurality of electrophoretic particles in an electronic ink layer according to the plurality of voltage data.

13. The image processing device of claim 12, wherein the electronic ink layer includes a plurality of electrophoretic particles, and the plurality of electrophoretic particles belongs to different types.

* * * * *